US008099782B1

(12) United States Patent
Dash et al.

(10) Patent No.: US 8,099,782 B1
(45) Date of Patent: *Jan. 17, 2012

(54) EVENT AGGREGATION IN A NETWORK

(75) Inventors: Debabrata Dash, Sunnyvale, CA (US); Hector Aguilar-Macias, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 73 days.

This patent is subject to a terminal disclaimer.

(21) Appl. No.: 12/620,345

(22) Filed: Nov. 17, 2009

Related U.S. Application Data

(63) Continuation of application No. 10/975,962, filed on Oct. 27, 2004, now Pat. No. 7,644,438.

(51) Int. Cl.
*G08B 23/00* (2006.01)
(52) U.S. Cl. ............... 726/22; 726/14; 726/23; 726/24; 703/17
(58) Field of Classification Search ............ 726/14, 726/22–24; 703/17
See application file for complete search history.

(56) References Cited

U.S. PATENT DOCUMENTS

| 5,557,742 A | 9/1996 | Smaha et al. |
| 5,717,919 A | 2/1998 | Kodavalla et al. |
| 5,850,516 A | 12/1998 | Schneier |
| 5,956,404 A | 9/1999 | Schneier et al. |
| 5,978,475 A | 11/1999 | Schneier et al. |
| 6,070,244 A | 5/2000 | Orchier et al. |
| 6,134,664 A | 10/2000 | Walker |
| 6,192,034 B1 | 2/2001 | Hsieh et al. |
| 6,275,942 B1 | 8/2001 | Bernhard et al. |
| 6,321,338 B1 | 11/2001 | Porras et al. |
| 6,400,265 B1 | 6/2002 | Saylor et al. |
| 6,408,391 B1 | 6/2002 | Huff et al. |
| 6,408,404 B1 | 6/2002 | Ladwig |
| 6,484,203 B1 | 11/2002 | Porras et al. |
| 6,542,075 B2 | 4/2003 | Barker et al. |
| 6,694,362 B1 | 2/2004 | Secor et al. |
| 6,704,874 B1 | 3/2004 | Porras et al. |
| 6,708,212 B2 | 3/2004 | Porras et al. |
| 6,711,615 B2 | 3/2004 | Porras et al. |
| 6,839,850 B1 | 1/2005 | Campbell et al. |
| 6,928,556 B2 | 8/2005 | Black et al. |
| 6,966,015 B2 | 11/2005 | Steinberg et al. |
| 6,985,920 B2 | 1/2006 | Bhattacharya et al. |
| 6,988,208 B2 | 1/2006 | Hrabik et al. |
| 7,039,953 B2 | 5/2006 | Black et al. |
| 7,043,727 B2 | 5/2006 | Bennett et al. |

(Continued)

FOREIGN PATENT DOCUMENTS
WO WO 02/45315 6/2002
(Continued)

OTHER PUBLICATIONS

U.S. Appl. No. 60/405,921, filed Aug. 26, 2002.
(Continued)

*Primary Examiner* — Thanhnga Truong

(57) ABSTRACT

A network system can have a plurality of distributed software agents configured to collect events from network devices. In one embodiment, the agents are configured to aggregate the events. In one embodiment of the present invention, an agent includes a device interface to receive an event from a network device, a plurality of aggregation profiles, and an agent aggregate module to select one of the plurality of aggregation profiles, and increment an event count of an aggregate event representing the received event using the selected aggregation profile.

24 Claims, 4 Drawing Sheets

U.S. PATENT DOCUMENTS

| | | | |
|---|---|---|---|
| 7,085,703 | B2 | 8/2006 | Gabele et al. |
| 7,089,428 | B2 | 8/2006 | Farley et al. |
| 7,127,743 | B1 | 10/2006 | Khanolkar et al. |
| 7,143,444 | B2 | 11/2006 | Porras et al. |
| 7,159,237 | B2 | 1/2007 | Schneier et al. |
| 7,168,093 | B2 | 1/2007 | Hrabik et al. |
| 7,171,689 | B2 | 1/2007 | Beavers |
| 7,219,239 | B1 | 5/2007 | Njemanze et al. |
| 7,260,844 | B1 | 8/2007 | Tidwell et al. |
| 7,278,160 | B2 | 10/2007 | Black et al. |
| 7,308,689 | B2 | 12/2007 | Black et al. |
| 7,318,178 | B2 | 1/2008 | Steinberg et al. |
| 7,333,999 | B1 | 2/2008 | Njemanze |
| 7,340,776 | B2 | 3/2008 | Zobel et al. |
| 7,370,359 | B2 | 5/2008 | Hrabik et al. |
| 7,376,969 | B1 | 5/2008 | Njemanze et al. |
| 7,379,993 | B2 | 5/2008 | Valdes et al. |
| 7,418,733 | B2 | 8/2008 | Connary et al. |
| 7,437,359 | B2 | 10/2008 | Aguilar-Macias et al. |
| 7,483,972 | B2 | 1/2009 | Bhattacharya et al. |
| 7,506,373 | B2 | 3/2009 | Morin et al. |
| 7,509,677 | B2 | 3/2009 | Saurabh et al. |
| 7,562,388 | B2 | 7/2009 | Hackenberger et al. |
| 7,577,633 | B2 | 8/2009 | Shankar et al. |
| 7,594,260 | B2 | 9/2009 | Porras et al. |
| 7,644,365 | B2 | 1/2010 | Bhattacharya et al. |
| 7,644,438 | B1 | 1/2010 | Dash et al. |
| 7,647,632 | B1 | 1/2010 | Ward et al. |
| 2002/0019945 | A1 | 2/2002 | Houston et al. |
| 2002/0147803 | A1 | 10/2002 | Dodd et al. |
| 2003/0084349 | A1 | 5/2003 | Friedrichs et al. |
| 2003/0093692 | A1 | 5/2003 | Porras |
| 2003/0188189 | A1 | 10/2003 | Desai et al. |
| 2003/0221123 | A1 | 11/2003 | Beavers |
| 2004/0024864 | A1 | 2/2004 | Porras et al. |
| 2004/0221191 | A1 | 11/2004 | Porras et al. |
| 2005/0027845 | A1 | 2/2005 | Secor et al. |
| 2006/0095587 | A1 | 5/2006 | Bhattacharya et al. |
| 2006/0212932 | A1 | 9/2006 | Patrick et al. |
| 2007/0136437 | A1 | 6/2007 | Shankar et al. |
| 2007/0150579 | A1 | 6/2007 | Morin et al. |
| 2007/0162973 | A1 | 7/2007 | Schneier et al. |
| 2007/0234426 | A1 | 10/2007 | Khanolkar et al. |
| 2008/0104046 | A1 | 5/2008 | Singla et al. |
| 2008/0104276 | A1 | 5/2008 | Lahoti et al. |
| 2008/0162592 | A1 | 7/2008 | Huang et al. |
| 2008/0165000 | A1 | 7/2008 | Morin et al. |
| 2010/0058165 | A1 | 3/2010 | Bhattacharya et al. |

FOREIGN PATENT DOCUMENTS

| | | |
|---|---|---|
| WO | WO 02/060117 | 8/2002 |
| WO | WO 02/078262 | 10/2002 |
| WO | WO 02/101988 | 12/2002 |
| WO | WO 03/009531 | 1/2003 |
| WO | WO 2004/019186 | 3/2004 |
| WO | WO 2005/001655 | 1/2005 |
| WO | WO 2005/026900 | 3/2005 |

OTHER PUBLICATIONS

U.S. Appl. No. 10/308,767, filed Dec. 2, 2002.
U.S. Appl. No. 10/308,548, filed Dec. 2, 2002.
U.S. Appl. No. 10/308,941, filed Dec. 2, 2002.
U.S. Appl. No. 10/308,416, filed Dec. 2, 2002.
U.S. Appl. No. 10/308,418, filed Dec. 2, 2002.
U.S. Appl. No. 10/308,417, filed Dec. 2, 2002.
U.S. Appl. No. 10/308,584, filed Dec. 2, 2002.
U.S. Appl. No. 10/683,221, filed Oct. 10, 2003.
U.S. Appl. No. 10/683,191, filed Oct. 10, 2003.
U.S. Appl. No. 10/713,471, filed Nov. 14, 2003.
U.S. Appl. No. 10/733,073, filed Dec. 10, 2003.
U.S. Appl. No. 10/821,459, filed Apr. 9, 2004.
U.S. Appl. No. 10/839,563, filed May 4, 2004.
U.S. Appl. No. 10/976,075, filed Oct. 27, 2004.
U.S. Appl. No. 10/974,105, filed Oct. 27, 2004.
U.S. Appl. No. 11/021,601, filed Dec. 23, 2004.
U.S. Appl. No. 11/023,942, filed Dec. 24, 2004.
U.S. Appl. No. 11/070,024, filed Mar. 1, 2005.
U.S. Appl. No. 11/740,203, filed Apr. 25, 2007.
U.S. Appl. No. 11/836,251, filed Aug. 9, 2007.
U.S. Appl. No. 12/098,322, filed Apr. 4, 2008.
ARCSIGHT, "About ArcSight Team," date unknown, [online] [Retrieved on Oct. 25, 2002] Retrieved from the Internet <URL: http://www.arcsight.com/about_team.htm>.
ARCSIGHT, "About Overview," Oct. 14, 2002, [online] [Retrieved on Apr. 21, 2006] Retrieved from the Internet <URL: http://web.archive.org/web/20021014041614/http://www.arcsight.com/about.htm>.
ARCSIGHT, "Contact Info," date unknown, [online] [Retrieved on Oct. 25, 2002] Retrieved from the Internet <URL: http://www.arcsight.com/contact.htm>.
ARCSIGHT, "Enterprise Coverage: Technology Architecture," date unknown, [online] Retrieved from the Internet <URL: http://www.snaiso.com/Documentation/Arcsight/arcsight_archdta.pdf>.
ARCSIGHT, "Managed Process: ArcSight Reporting System," date unknown, [online] Retrieved from the Internet <URL: http://www.snaiso.com/Documentation/Arcsight/arcsight_reportsys.pdf>.
ARCSIGHT, "Managed Process: Console-Based Management," date unknown, [online] Retrieved from the Internet <URL: http://www.snaiso.com/Documentation/Arcsight/arcsight_console.pdf >.
ARCSIGHT, "Precision Intelligence: SmartRulesTM and Cross-Correlation," date unknown, [online] Retrieved from the Internet <URL: http://www.snaiso.com/Documentation/Arcsight/arcsight_correlation.pdf>.
ARCSIGHT, "Precision Intelligence: SmartAgentTM," date unknown, [online] Retrieved from the Internet <URL: http://www.ossmanagement.com/SmartAgent.pdf>.
ARCSIGHT, "Product Info: Product Overview and Architecture," date unknown, [online] [Retrieved on Oct. 25, 2002] Retrieved from the Internet <URL: http://www.arcsight.com/product.htm>.
ARCSIGHT, "Product Info: 360° Intelligence Yields Precision Risk Management," date unknown, [online] [Retrieved on Oct. 25, 2002] Retrieved from the Internet <URL: http://www.arcsight.com/product_info01.htm>.
ARCSIGHT, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.
ARCSIGHT, "Product Info: ArcSight Cross-Device Correlation," date unknown, [online] [Retrieved on Oct. 25, 2005] Retrieved from the Internet <URL: http://www.arcsight.com/product_info03.htm>.
ARCSIGHT, "Product Info: ArcSight Manager," date unknown, [online] [Retrieved on Oct. 25, 2002] Retrieved from the Internet <URL: http://www.arcsight.com/product_info04.htm>.
ARCSIGHT, "Product Info: ArcSight Console," date unknown, [online] [Retrieved on Nov. 15, 2002] Retrieved from the Internet <URL: http:www.arcsight.com/product_info05.htm>.
ARCSIGHT, "Product Info: ArcSight Reporting System," date unknown, [online] [Retrieved on Oct. 25, 2002] Retrieved from the Internet <URL: http:www.arcsight.com/product_info06.htm>.
ARCSIGHT, "Product Info: Enterprise Scaling," date unknown, [online] [Retrieved on Oct. 25, 2002] Retrieved from the Internet <URL: http://www.arcsight.com/product_info07.htm>.
ARCSIGHT, "Security Management for the Enterprise," 2002, [online] [Retrieved on Oct. 25, 2002] Retrieved from the Internet <URL: http:www.arcsight.com/>.
ARCSIGHT, "Technical Brief: How Correlation Eliminates False Positives," date unknown, source unknown.
Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newlook/resources/IDFAQ/matching.htm>.
Burleson, D., "Taking Advantage of Object Partitioning in Oracle8i," Nov. 8, 2000, [online] [Retrieved on Apr. 20, 2004] Retrieved from the Internet <URL: http://www.dba-oracle.com/art_partit.htm>.
CERT Coordination Center, "Overview of Attack Trends," 2002, [online] Retrieved from the Internet <URL: http://www.cert.org/archive/pdf/attack_trends.pdf>.

Cheung, S. et al., "EMERALD Intrusion Incident Report: 601 Message Specification," Aug. 10, 2000, System Design Laboratory, SRI International.

Derodeff, C. "Got Correlation? Not Without Normalization," 2002, [online] Retrieved from the Internet <URL: http://www.svic.com/papers/pdf/Got-Correlation_rmalization.pdf>.

Haley Enterprise, "Production Systems," 2002, [online] [Retrieved on Oct. 29, 2002] Retrieved from the Internet <URL: http://www.haley.com/0072567836705810/ProductionSystems.html>.

Haley Enterprise, "The Rete Algorithm," 2002, [online] [Retrieved on Oct. 29, 2002] Retrieved from the Internet <URL: http://www.haley.com/0072567836705810/ReteAlgorithm.html>.

Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.

Halme, L.R. et al., "AINT Misbehaving: A Taxonomy of Anti-Intrusion Techniques," 2000, [online] [Retrieved on Nov. 1, 2002] Retrieved from the Internet <URL: http://www.sans.org/newlook/resources/IDFAQ/aint.htm>.

Heberlein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.

Ingargiola, G., "The Rete Algorithm," date unknown, [online] [Retrieved on Oct. 29, 2002] Retrieved from the Internet <URL: http://yoda.cis.temple.edu:8080/UGAIWWW/lectures/rete.html>.

Javitz, H. S., et al., "The NIDES Statistical Component Description and Justification," SRI Project 3131, Contract N00039-92-C-0015, Annual Report, A010, Mar. 7, 1994.

Jou, Y. F., et al., "Architecture Design of a Scalable Intrusion Detection System for the Emerging Network Infrastructure," MCNC, Technical Report CDRL A005, Apr. 1997.

Lindqvist, U. et al., "Detecting Computer and Network Misuse Through the Production-Based Expert System Toolset (P-BEST)," Proceedings of the IEEE Symposium on Security and Privacy, Oakland, California, May 9-12, 1999.

National Institute of Standards and Technology (NIST), "Federal Information Processing Standards Publication (FIPS Pub) 199: Standards for Security Categorization of Federal Information and Information Systems", Feb. 2004.

National Institutes of Health (NIH), "Table 1: Security Categorization of Federal Information and Information Systems," revised Jul. 8, 2005, [online] [retrieved on Apr. 6, 2006] Retrieved from the Internet <URL: http://irm.cit.nih.gov/security/table1.htm>.

Porras, P.A. et al., "EMERALD: Event Monitoring Enabling Responses to Anomalous Live Disturbances," Oct. 1997, Proceedings of the 20th NIST-NCSC National Information Systems Security (NISS) Conference.

Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.

Porras, P. A., et al., "Live Traffic Analysis of TCP/IP Gateways," Symposium on Networks and Distributed Systems Security, Internet Society, Mar. 1998.

Robinson, S. L., "Memorandum Opinion" in *SRI International, Inc. v. Internet Security Systems, Inc. and Symantec Corporation* (D. Del., Civ. No. 04-1199-SLR), Oct. 17, 2006.

Valdes, A., et al., "Statistical Methods for Computer Usage Anomaly Detection Using NIDES (Next-Generation Intrusion Detection Expert System)," Proceedings of the Third International Workshop on Rough Sets and Soft Computing (RSSC 94), Jan. 27, 1995, San Jose, CA, pp. 306-311.

Wood, M., et al., "Internet-Draft: Intrusion Detection Message Exchange Requirements," Jun. 23, 2002, [online] [Retrieved on Nov. 1, 2002] Retrieved from the Internet <URL: http://www.silicondefense.com/idwg/draft-ieff-idwg-requirements-07.txt>.

Event Filter Input Box 42

Please Check The Event Fields That Must Be The Same:

- Source IP ☐
- Target IP ☐
- Source Port ☐
- Target Port ☐
- ...
- Event Priority ☐

Check Boxes 44

Max Time Input Box 46

Max Count Input Box 48

Save As Input Box 50

Aggregation Profile Editor 40

Figure 4

EVENT AGGREGATION IN A NETWORK

CROSS-REFERENCE TO RELATED APPLICATION

This application is a continuation of U.S. application Ser. No. 10/975,962, filed on Oct. 27, 2004, entitled "Security Event Aggregation at Software Agent" which is incorporated herein by reference in its entirety.

FIELD OF THE INVENTION

The present invention relates to a computer-based system for capturing security events from heterogeneous and homogenous sources, and specifically to aggregating a number of security events.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, intrusion detection systems (IDS) have been developed to help uncover attempts by unauthorized persons and/or devices to gain access to computer networks and the information stored therein. In addition, network devices such as routers and firewalls maintain activity logs that can be used to examine such attempts.

Intrusion detection may be regarded as the art of detecting inappropriate, incorrect or anomalous activity within or concerning a computer network or system. The most common approaches to intrusion detection are statistical anomaly detection and pattern-matching detection. IDS that operate on a host to detect malicious activity on that host are called host-based IDS (HIDS), which may exist in the form of host wrappers/personal firewalls or agent-based software, and those that operate on network data flows are called network-based IDS (NIDS). Host-based intrusion detection involves loading software on the system (the host) to be monitored and using log files and/or the host's auditing agents as sources of data. In contrast, a network-based intrusion detection system monitors the traffic on its network segment and uses that traffic as a data source. Packets captured by the network interface cards are considered to be of interest if they match a signature.

Regardless of the data source, there are two complementary approaches to detecting intrusions: knowledge-based approaches and behavior-based approaches. Almost all IDS tools in use today are knowledge-based. Knowledge-based intrusion detection techniques involve comparing the captured data to information regarding known techniques to exploit vulnerabilities. When a match is detected, an alarm is triggered. Behavior-based intrusion detection techniques, on the other hand, attempt to spot intrusions by observing deviations from normal or expected behaviors of the system or the users (models of which are extracted from reference information collected by various means). When a suspected deviation is observed, an alarm is generated.

Advantages of the knowledge-based approaches are that they have the potential for very low false alarm rates, and the contextual analysis proposed by the intrusion detection system is detailed, making it easier for a security officer using such an intrusion detection system to take preventive or corrective action. Drawbacks include the difficulty in gathering the required information on the known attacks and keeping it up to date with new vulnerabilities and environments.

Advantages of behavior-based approaches are that they can detect attempts to exploit new and unforeseen vulnerabilities. They are also less dependent on system specifics. However, the high false alarm rate is generally cited as a significant drawback of these techniques and because behaviors can change over time, the incidence of such false alarms can increase.

Regardless of whether a host-based or a network-based implementation is adopted and whether that implementation is knowledge-based or behavior-based, an intrusion detection system is only as useful as its ability to discriminate between normal system usage and true intrusions (accompanied by appropriate alerts). If intrusions can be detected and the appropriate personnel notified in a prompt fashion, measures can be taken to avoid compromises to the protected system. Otherwise such safeguarding cannot be provided. Accordingly, what is needed is a system that can provide accurate and timely intrusion detection and alert generation so as to effectively combat attempts to compromise a computer network or system.

SUMMARY OF THE INVENTION

A network security system can have a plurality of distributed software agents configured to collect security events from network devices. In one embodiment, the agents are configured to aggregate the security events. In one embodiment of the present invention, an agent includes a device interface to receive a security event from a network device, a plurality of aggregation profiles, and an agent aggregate module to select one of the plurality of aggregation profiles, and increment an event count of an aggregate event representing the received security event using the selected aggregation profile.

BRIEF DESCRIPTION OF THE DRAWINGS

The present invention is illustrated by way of example, and not limitation, in the figures of the accompanying drawings in which:

FIG. 4 is a user interface according to one embodiment of the present invention.

DETAILED DESCRIPTION

Figure 1:
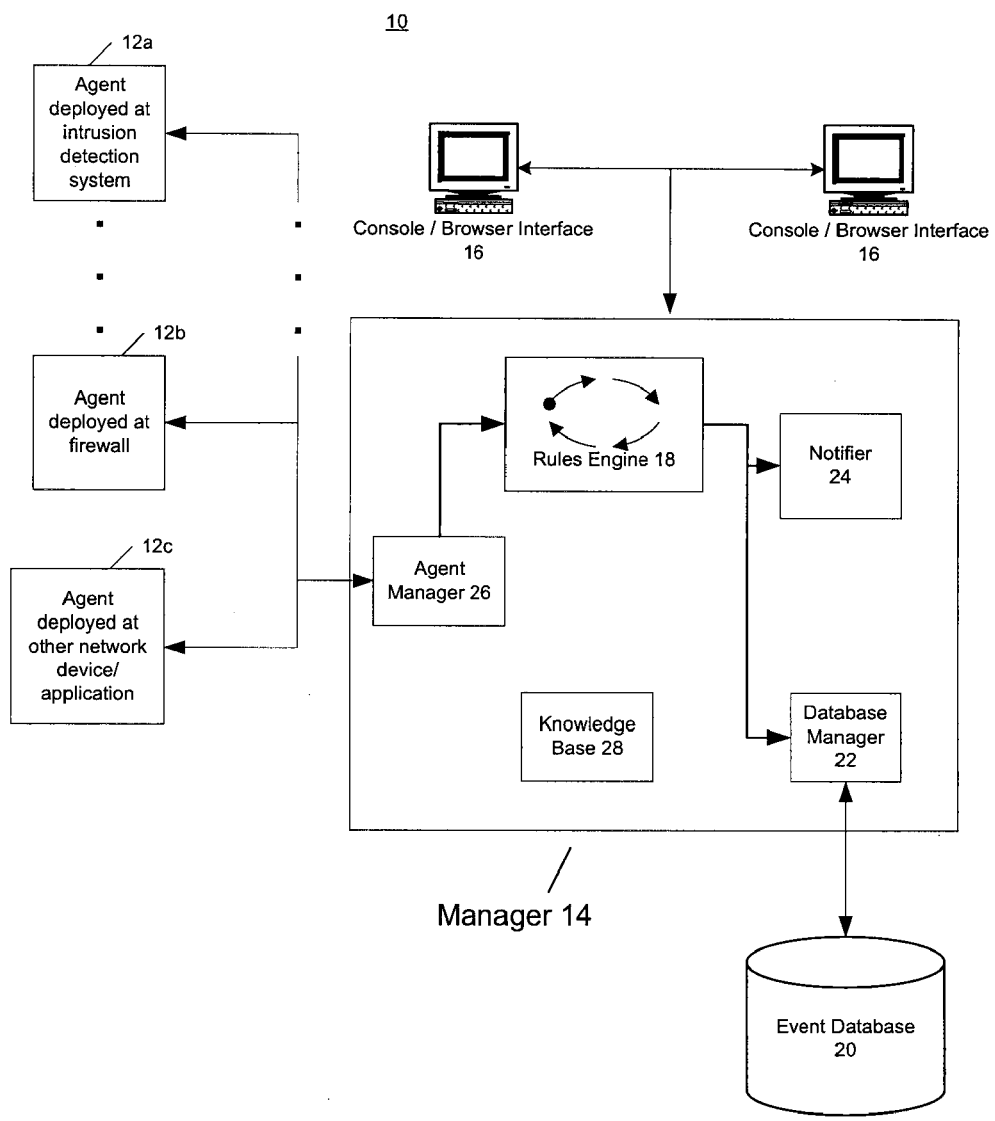
FIG. 1 is a block diagram of a network security system according to one embodiment of the present invention.

Although the present system will be discussed with reference to various illustrated examples, these examples should not be read to limit the broader spirit and scope of the present invention. For example, the examples presented herein describe distributed agents, managers and consoles, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, an example of a computer-based network security system 10 architected in accordance with an embodiment of the present invention is illustrated. System 10 includes agents 12, one or more managers 14 and one or more consoles 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12 are software programs that provide efficient, real-time (or near real-time) local event data capture and filtering from a variety of network security devices and/or applications. The primary sources of security events are common network security devices, such as firewalls, intrusion detection systems and operating system logs. Agents 12 can collect events from any source that produces event logs or messages and can operate at the native device, at consolidation points within the network, and/or through simple network management protocol (SNMP) traps.

Agents 12 are configurable through both manual and automated processes and via associated configuration files. Each agent 12 may include one or more software modules including a normalizing component, a time correction component, an aggregation component, a batching component, a resolver component, a transport component, and/or additional components. These components may be activated and/or deactivated through appropriate commands in the configuration file.

Managers 14 may be server-based components that further consolidate, filter and cross-correlate events received from the agents, employing a rules engine 18 and a centralized event database 20. One role of manager 14 is to capture and store all of the real-time and historic event data to construct (via database manager 22) a complete, enterprise-wide picture of security activity. The manager 14 also provides centralized administration, notification (through one or more notifiers 24), and reporting, as well as a knowledge base 28 and case management workflow. The manager 14 may be deployed on any computer hardware platform and one embodiment utilizes a relational database management system such as an Oracle™ database to implement the event data store component. Communications between manager 14 and agents 12 may be bi-directional (e.g., to allow manager 14 to transmit commands to the platforms hosting agents 12) and encrypted. In some installations, managers 14 may act as concentrators for multiple agents 12 and can forward information to other managers (e.g., deployed at a corporate headquarters).

Consoles 16 are computer- (e.g., workstation-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal or handheld computer (which takes the place of console 16) to provide some or all of the functionality of a console 16. Browser access is particularly useful for security professionals that are away from the consoles 16 and for part-time users. Communication between consoles 16 and manager 14 is bi-directional and may be encrypted.

Through the above-described architecture the present invention can support a centralized or decentralized environment. This is useful because an organization may want to implement a single instance of system 10 and use an access control list to partition users. Alternatively, the organization may choose to deploy separate systems 10 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. Systems 10 can also be deployed in a corporate hierarchy where business divisions work separately and support a rollup to a centralized management function.

The exemplary network security system illustrated in FIG. 1 is described in further detail in U.S. application Ser. No.

10/308,415, entitled "Real Time Monitoring and Analysis of Events from Multiple Network Security Devices", filed Dec. 2, 2002, now issued as U.S. Pat. No. 7,376,969, which is hereby incorporated fully by reference.

The agents 12 described above are configured, in one embodiment, to perform various pre-correlation processing on the security events they observe at their respective monitor devices. An agent 12, for example, can normalize observed events (i.e., map events to some universal schema used by the network security system 10), aggregate events to save memory and bandwidth, and batch events for efficient transmission. Such agent 12 functionalities, and others, are described in further detail in U.S. application Ser. No. 10/308,584, entitled "Method for Aggregating Events to be Reported by Software Agent", filed Dec. 2, 2002, which is hereby incorporated fully by reference.

Several embodiments for security event aggregation are described in U.S. application Ser. No. 10/308,584. Security event aggregation is the combining of multiple security events into a single security event. For example, five code red attacks can be represented by an aggregated code red event with a count field indicating that five events are represented. The aggregation described in U.S. application Ser. No. 10/308,584 is event-based, meaning that events are aggregated based on some defined criteria of sameness.

The embodiments of the present invention described herein refine the aggregation procedure to include event field-based aggregation. Each event has numerous event fields, as described in U.S. application Ser. No. 10/308,415, such as start and end time, source and destination IP and port, event name, and various other fields. In one embodiment, one of the fields—called "event type" in one embodiment—identifies a category the event belongs to. Thus, an event representing several other security events (i.e., an aggregate event), can be identified as such in the event type field.

Figure 2:
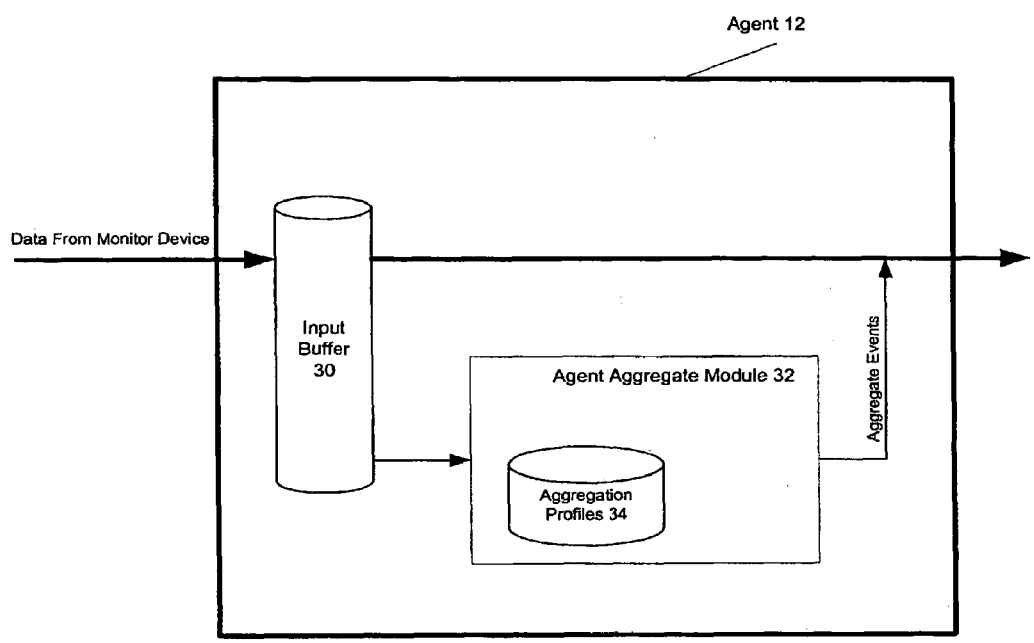
FIG. 2 is a block diagram of a software agent according to one embodiment of the present invention.

One embodiment of event aggregation is now described with reference to FIG. 2. FIG. 2 illustrates a software agent 12 in more detail. There are other aspects of the agent 12 that are not relevant to event aggregation, and are thus not shown, such as an output buffer. Data from the monitored device associated with the agent 12 is used in one embodiment to fill an input buffer 30. The security events stored in the input buffer 30 are already normalized by the agent 12 in one embodiment.

In one embodiment, an agent aggregate module 32 generates aggregate events from the security events stored in the input buffer 30. In one embodiment, security events represented by an aggregate event are deleted and discarded, while in other embodiments, they are stored for transmission to the manager 14 at a later time, perhaps when more bandwidth is available. The aggregate events are then inserted into the output stream generated by the agent 12, and are sent to the manager 14.

In one embodiment, the agent aggregate module 32 has access to one or more aggregation profiles 34. In one embodiment, an aggregation profile 34 defines the aggregation parameters that specify the functioning of the agent aggregate module 32. For example, an aggregation profile can define the event fields that must be the same for each event that is to be represented by the same aggregate event.

In one embodiment, an aggregation profile also contains a Boolean condition that the event must satisfy (i.e., the condition evaluates to true) in order for that event to be aggregated using this profile. In one embodiment, the profiles are searched in order for an event, and the first one whose condition is satisfied is the profile selected to be used to aggregate an event. This is sometimes called a best-first search. In another embodiment, an exhaustive search can be performed over the aggregation profiles that finds the "best" overall aggregation profile (not just the first "satisfactory" profile) according to a more complex filter.

As a demonstrative example, agent 12b is deployed at a firewall. The firewall generates an event for all Windows broadcast messages it sees, which are then provided to the agent 12b. One aggregation profile 34 accessible by agent 12b specifies that Windows broadcast events are to be aggregated if the source IP is the same. Thus, an aggregate event for a Windows broadcast will carry information about how many Windows broadcast messages were sent by some machine during some time interval. Since this information may be all a network administrator wishes to have, other information contained in the aggregated security events need not be included in the aggregate events to simplify the aggregate event and to reduce its size.

To that end, in one embodiment, all other fields are discarded as irrelevant. In another embodiment, all fields except for start and end time are discarded. In one embodiment, the start time of an aggregate event is the start time of the earliest aggregated event and the end time of an aggregate event is the end time of the latest aggregated event being represented by the aggregate event. The aggregation profile can specify other attributes as well, some of which are described further below.

Figure 3:
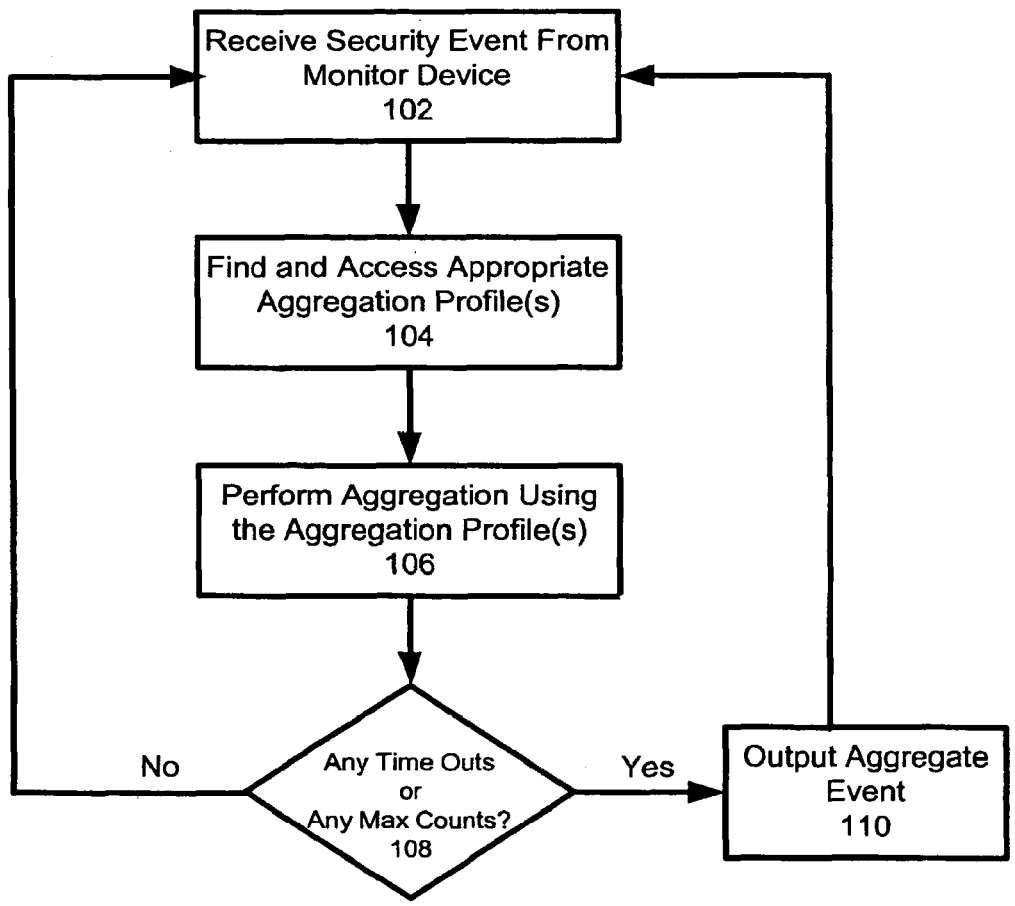
FIG. 3 is a flow diagram of event aggregation according to one embodiment of the present invention.

One embodiment of the aggregation method performed by the agent is now described further with reference to FIG. 3. In block 102, the agent 12 receives a security event from the monitor device at which the agent 12 is deployed. Then the security event may undergo additional processing, such as normalization (not shown). In block 104, one or more aggregation profiles associated with the security event are located and accessed.

Considering the Windows broadcast example above, there may be an aggregation profile associated with Windows broadcast events. For example, for these events, the profile can specify that only the source IP fields must be the same for events to be included in a single aggregate event. The aggregation profile can have other attributes described further below.

In one embodiment, block 104 is performed implicitly by passing the event stream containing the event through a series of event filters, where the application of the filters defines the appropriate aggregation profile. Thus, finding the aggregation profile associated with the received event, in one embodiment, means passing the event through event filters, until one applies. In one embodiment, if none of the event filters applies, then the default profile of no aggregation is applied to the event, and the event is provided to the manager 14.

In block 106, the aggregation profile is used to perform the aggregation. Considering the Windows broadcast example, this includes locating an aggregate event matching the source IP of the security event received in block 102. If such an aggregate event exists, then its count is incremented by one to represent the new Windows broadcast event. If no such aggregate event exists, then a new aggregate event can be created with a count of 1, the count to be incremented when other Windows broadcasts from the same source IP are received.

In one embodiment, aggregate events are provided to the manager 14 upon the expiration of some time interval, the reaching of a certain maximum count number, or a combination of these two criteria. In other embodiments, other cutoffs may be used in addition to or instead of the above two criteria. A time out means that when the time interval expires, the aggregate event is sent. For example, the Windows broadcast aggregate event may be configured to be sent every hour.

Similarly, reaching a maximum count means that the aggregate event represent a maximum allowed number of aggregated events. For example, the Windows broadcast aggregate event may be configured to be sent once 50 Windows broadcast events are aggregated. A combination of the two cutoffs can also be used, for example, by sending the aggregate event at the earlier occurrence of either time out or max count reached condition.

In one embodiment, in block 108, a determination is made about having any aggregate events that need to be sent to the manager 14, that is, whether any aggregate events are in time out or max count reached condition. If not, processing proceeds with the reception of the next security event at block 102. However, if a cutoff condition is reached, those aggregate events that satisfy the cutoff conditions are output in block 110. In one embodiment, outputting aggregate events can be done by placing the aggregate events in an output buffer or simply inserting the aggregate events in the output stream generated by the agent 12. Then, processing proceeds with the reception of the next security event at block 102.

With respect to block 104, it was noted that a security event received in block 102 can have more than one associated aggregation profile. In other words, a single security event can be counted by multiple aggregate events, each having a different aggregation profile. This can happen, for example, when an agent supports multiple transports, each to a different destination.

In one embodiment, one of the agents 12 is configured to report to a manager 14 and a file system. The manager 14 may benefit from more frequent reports and may require a certain type of aggregate event to be sent every five minutes. However, the file system to which the agent 12 sends events may only need to see aggregate events of this type once a day. The agent 12 creates two event streams, one for each transport. The same event occurring in both transport streams will be aggregated with two different aggregation profiles. Thus, the event will satisfy the filters of two profiles, and both are accessed in block 104.

In another embodiment, the agent 12 reports to multiple destinations (e.g. multiple managers 14, or a manager 14 and some other destination such as a file server or third party system), the event stream is divided into multiple identical streams following normalization. Each stream is then provided for aggregation, where each stream is passed through a different set of event filters that are associated with a different set of aggregation profiles. Thus, the different aggregate events are inserted into each stream depending on the results of the aggregation.

In the embodiments described above, an event is only aggregated once per transport stream. In other embodiments, multiple aggregation profiles may be used on a single security event within one transport stream.

In one embodiment, as described above, a user authors the aggregation profiles 34 accessed by the agent aggregate module 32. Thus, in one embodiment, the user/console interface 16 provides an aggregation profile editor 40 to the user. One embodiment of the aggregation profile editor 40 is now described with reference to FIG. 4.

In one embodiment, a profile can be designed for events that match a filter. The event filter can be defined using input box 42, a series of input boxes, a separate filter editor, or some other user interface mechanism. In one embodiment, the event filter is a regular filter that filters events based on event field values, such as event category or event name. For example, one event filter for an aggregation profile in an agent associated with a firewall may apply the aggregation policy to all "pass-accept" type events.

The editor 40 shown in FIG. 4 allows the user to designate the event fields on which aggregation is based using a checklist of event fields. In one embodiment, the required fields are selected using check boxes 44. The list of event fields may include all possible event fields, or it may be tailored to those most often useful in event aggregation. Any possible field of a security event can be used in this manner including fields related to the root, the source of the event (e.g., asset name or DNS domain), and the target of the event (e.g., host name or MAC address). A real world security event can have hundreds of event fields, all of which are candidates for use in aggregation or display in a user interface.

In one embodiment, a max time (time interval after which aggregate event is sent) and/or max count (maximum raw events to be represented by aggregate event) can also be specified using input boxes 46 and 48 of the editor respectively. The created aggregation profile then can be saved and named using the "save as" feature and input box 50. Other attributes and parameters of the aggregation process can also be specified using a more detailed editor 40 (not pictured to preserve the simple illustration of the invention). For example, the user may be able to specify the manager 14 to which aggregate events are to be directed using the particular aggregation profile. Various other attributes of the aggregation may be further configured using the editor 40.

When a manager 14 receives an aggregate event, in one embodiment, the manager 14 processes the event differently than a regular, non-aggregate event. In one embodiment, the manager "unpacks" the aggregate event by generating as many regular events as there are in the count of the aggregate event, and inserting them in the input stream of the manager 14. In another embodiment, the manager 14 does not actually generate regular events, but still functions as if all the regular events represented by the aggregate events have been received.

Thus, a network security system and a distributed agent implementing event aggregation have been described. In the foregoing description, various specific values and data structures were given names, such as "aggregate event" and "max count," and various specific modules, such as "agents" and "agent aggregate module" have been described. However, these names are merely to describe and illustrate various aspects of the present invention, and in no way limit the scope of the present invention. Furthermore, various modules, such as the manager 14, and the agents 12 in FIG. 1, can be implemented as software or hardware modules, or without dividing their functionalities into modules at all. The present invention is not limited to any modular architecture either in software or in hardware, whether described above or not.

What is claimed is:

1. A method for aggregating events in a network, comprising:

receiving an event from a network device;

selecting one of a plurality of aggregation profiles, wherein the selected aggregation profile defines a maximum time range;

identifying an aggregate event corresponding to the selected aggregation profile, wherein the aggregate event includes a count field whose value indicates how many events are represented by the aggregate event;

incrementing the count field value to represent the received event; and transmitting the aggregate event when a time range of the events represented by the aggregate event exceeds the maximum time range.

2. The method of claim 1, wherein selecting the one aggregation profile comprises selecting an aggregation profile associated with an event filter when the received event satisfies the event filter.

3. The method of claim 1, wherein the selected aggregation profile further defines parameters for events that are represented by the aggregate event.

4. The method of claim 1, wherein the selected aggregation profile enumerates one or more event fields whose values must match for two events to be considered satisfactorily similar for aggregation.

5. The method of claim 1, wherein the selected aggregation profile enumerates one or more event fields preserved by the aggregate event.

6. The method of claim 1, wherein the selected aggregation profile further defines a maximum event count.

7. The method of claim 6, further comprising transmitting the aggregate event when the incremented count field value equals the maximum event count.

8. The method of claim 1, further comprising:
selecting a second aggregation profile of the plurality of aggregation profiles;
identifying a second aggregate event corresponding to the second selected aggregation profile, wherein the second aggregate event includes a count field whose value indicates how many events are represented by the second aggregate event; and
incrementing the count field value of the second aggregate event to represent the received event.

9. The method of claim 8, further comprising transmitting the second aggregate event to an entity different from the entity receiving the aggregate event.

10. The method of claim 1, wherein the network device comprises a firewall or an intrusion detection system.

11. A non-transitory computer readable medium having stored thereon computer readable instructions which, when executed by a processor, cause the processor to perform a method for aggregating events in a network, the method comprising:
receiving an event from a network device;
selecting one of a plurality of aggregation profiles, wherein the selected aggregation profile defines a maximum time range;
identifying an aggregate event corresponding to the selected aggregation profile, wherein the aggregate event includes a count field whose value indicates how many events are represented by the aggregate event;
incrementing the count field value to represent the received event; and
transmitting the aggregate event when a time range of the events represented by the aggregate event exceeds the maximum time range.

12. A system for aggregating events in a network, comprising:
a non-transitory computer readable medium storing computer readable instructions for performing a method, the method comprising:
receiving an event from a network device;
selecting one of a plurality of aggregation profiles, wherein the selected aggregation profile defines a maximum time range;
identifying an aggregate event corresponding to the selected aggregation profile, wherein the aggregate event includes a count field whose value indicates how many events are represented by the aggregate event;
incrementing the count field value to represent the received event; and
transmitting the aggregate event when a time range of the events represented by the aggregate event exceeds the maximum time range; and
a processor configured to execute the computer readable instructions stored by the computer readable medium.

13. A method for aggregating events in a network, comprising:
receiving an event from a network device;
selecting one of a plurality of aggregation profiles, wherein the selected aggregation profile defines a maximum event count;
identifying an aggregate event corresponding to the selected aggregation profile, wherein the aggregate event includes a count field whose value indicates how many events are represented by the aggregate event;
incrementing the count field value to represent the received event; and
transmitting the aggregate event when the incremented count field value equals the maximum event count.

14. The method of claim 13, wherein selecting the one aggregation profile comprises selecting an aggregation profile associated with an event filter when the received event satisfies the event filter.

15. The method of claim 13, wherein the selected aggregation profile further defines parameters for events that are represented by the aggregate event.

16. The method of claim 13, wherein the selected aggregation profile enumerates one or more event fields whose values must match for two events to be considered satisfactorily similar for aggregation.

17. The method of claim 13, wherein the selected aggregation profile enumerates one or more event fields preserved by the aggregate event.

18. The method of claim 13, wherein the selected aggregation profile further defines a maximum time range.

19. The method of claim 18, further comprising transmitting the aggregate event when the time range of the events represented by the aggregate event exceeds the maximum time range.

20. The method of claim 13, further comprising:
selecting a second aggregation profile of the plurality of aggregation profiles;
identifying a second aggregate event corresponding to the second selected aggregation profile, wherein the second aggregate event includes a count field whose value indicates how many events are represented by the second aggregate event; and
incrementing the count field value of the second aggregate event to represent the received event.

21. The method of claim 20, further comprising transmitting the second aggregate event to an entity different from the entity receiving the aggregate event.

22. The method of claim 13, wherein the network device comprises a firewall or an intrusion detection system.

23. A non-transitory computer readable medium having stored thereon computer readable instructions which, when executed by a processor, cause the processor to perform a method for aggregating events in a network, the method comprising:
receiving an event from a network device;
selecting one of a plurality of aggregation profiles, wherein the selected aggregation profile defines a maximum event count;
identifying an aggregate event corresponding to the selected aggregation profile, wherein the aggregate event includes a count field whose value indicates how many events are represented by the aggregate event;

incrementing the count field value to represent the received event; and transmitting the aggregate event when the incremented count field value equals the maximum event count.

24. A system for aggregating events in a network, comprising:

a non-transitory computer readable medium storing computer readable instructions for performing a method, the method comprising:

receiving an event from a network device;

selecting one of a plurality of aggregation profiles, wherein the selected aggregation profile defines a maximum event count;

identifying an aggregate event corresponding to the selected aggregation profile, wherein the aggregate event includes a count field whose value indicates how many events are represented by the aggregate event;

incrementing the count field value to represent the received event; and transmitting the aggregate event when the incremented count field value equals the maximum event count; and a processor configured to execute the computer readable instructions stored by the computer readable medium.

* * * * *